United States Patent [19]
Jennings et al.

[11] Patent Number: 6,157,443
[45] Date of Patent: Dec. 5, 2000

[54] METHOD AND SYSTEM FOR TRANSPORTING DATA FOR MONITORING OPTICAL FIBERS

[75] Inventors: Mark R. Jennings, Andover; Richard Joseph Pimpinella, Hampton, both of N.J.

[73] Assignee: Lucent Technologies Inc., Murray Hill, N.J.

[21] Appl. No.: 09/136,260

[22] Filed: Aug. 19, 1998

[51] Int. Cl.$^7$ .................................................. G01N 21/00
[52] U.S. Cl. .......................................................... 356/73.1
[58] Field of Search .......................... 356/73.1; 359/569, 359/152, 114, 125, 167; 385/37, 33

[56] References Cited

U.S. PATENT DOCUMENTS 5,671,308    9/1997    Inoue .......................................... 385/37

*Primary Examiner*—Frank G. Font
*Assistant Examiner*—Tu T. Nguyen
*Attorney, Agent, or Firm*—Claude R. Narcisse

[57] ABSTRACT

The present invention provides viewing and monitoring equipment that can remotely operate and control test equipment to monitor optical links of a communication system and to determine whether the optical links are operating properly.

25 Claims, 2 Drawing Sheets

100

10

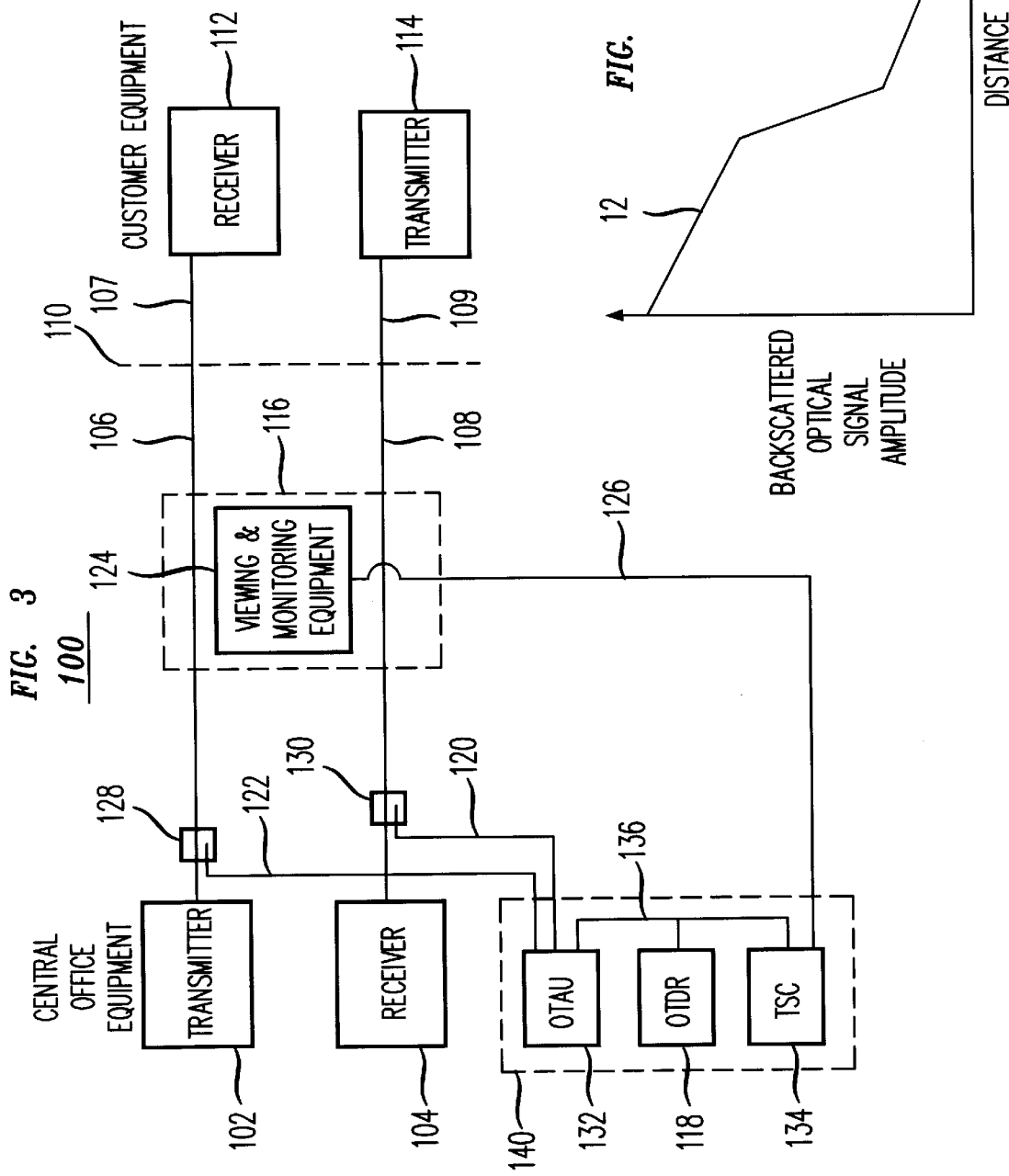

METHOD AND SYSTEM FOR TRANSPORTING DATA FOR MONITORING OPTICAL FIBERS

BACKGROUND OF THE INVENTION

1. Field of the Invention

The present invention relates to the viewing of data associated with optical links and more particularly to the viewing and monitoring of data associated with the optical links during the construction, restoration and maintenance of such optical links used in communication systems to determine and confirm the proper operation of the optical links.

2. Description of the Related Art

Communication systems many times use optical links to provide communication services to users by conveying communication signals between various equipment within the system. An optical link is a communication medium through which optical communication signals (hereinafter "optical signals") representing for example data, video, audio and other types of information are conveyed. Communication system providers typically own the optical links and associated equipment connected to such links. FIG. 1 depicts an exemplary communication system 100 that uses optical links to convey optical signals between a central office and a customer site. A central office typically contains equipment owned and operated by a system provider where such equipment transmits and receives various communication signals including communication signals destined for customers or received from customers. For the sake of clarity, only one customer site is shown connected to central office equipment. It is possible for an actual communication system to contain hundreds or even thousands of customer sites and various equipment sites positioned throughout the communication system.

Communication system 100 comprises system provider equipment and customer equipment, i.e., equipment owned and controlled by the system provider and the customer respectively. Demarcation line 110 is a symbolic representation of a boundary distinguishing between user equipment and system equipment. It is possible for demarcation line 110 to represent equipment which couple system provider equipment to customer equipment. For example, demarcation line 110 can be some type of enclosure, e.g., a network interface unit (not shown), within which optical links from the communication system terminate and are coupled to optical links from the customer which also terminate within the network interface unit. The network interface unit may be located at the customer site or nearby the customer site.

Transmitter 102 launches optical signals to the customer equipment via optical links 106 and 107. Receiver 104 receives optical signals from the customer equipment via optical links 108 and 109. At the customer site, optical signals are received and transmitted by receiver 112 and transmitter 114 respectively. Optical links 107 and 109, which are owned and controlled by the customer, are commonly referred to as local links. Typically, at the customer site and at the central office, the received optical signals are converted to electrical signals that are processed by electronic circuitry (not shown). Optical links 106 and 108 will hereinafter be referred to as system optical links.

During construction of communication systems such as the one depicted in FIG. 1, the performance and optical characteristics of optical links are monitored by a craftsperson under the employ of the service provider to confirm the operation of the optical links or determine if any problems exist within the optical links and the location of such problems. Craftspersons also inspect optical links of existing communication systems particularly after said links have undergone some type of reparation. Typically, at a location (116) (e.g., manhole, remote terminal) between a customer site and the central office, a craftsperson makes the necessary reparations or makes the appropriate connections (e.g., splicing) of optical fibers.

An optical communication link such as system optical link 106 or 108 comprises at least one optical cable having a plurality of individual optical fibers. Each optical fiber within the optical cable is carefully spliced using well known standard techniques. During the construction of a system optical communication link (e.g., links 106, 108), a craftsperson typically has to splice hundreds of optical fibers at each of a plurality of locations along the optical link. After each or a group of fibers have been connected (or spliced) at a location, the craftsperson has to confirm that the spliced fibers at that location (e.g., 116) are operating in accordance with design requirements of the communication system. In order to test the spliced fibers, Optical Time Domain Reflectometer (OTDR) 122, located at the central office, launches optical signals through the link being constructed (or repaired) in order to confirm the proper operation of the spliced fibers of the optical link. An OTDR is an instrument which launches optical signals through optical fibers and detects portions of the signal backscattered by the optical fiber. The OTDR generates data characterizing the optical signals based on the backscattered portions. Thus, typically for optical signals launched through an optical fiber, there exist corresponding backscattered portions of the signals which can be detected at the launch point or at some other point along the fiber. Based on the characteristics of the detected backscattered portions, OTDR 118 allows a properly trained craftsperson to determine the functionality or operability of the particular optical link being inspected and/or the location of any problems in the optical link.

FIG. 2 depicts a chart (10) of the amplitude of backscattered portions versus distance. Chart 10 is representative of the type of data generated by OTDR 118 that allow a craftsperson to confirm the proper operation of an optical fiber and/or the location of any problems within the fiber. The distance is measured from the OTDR to various points along an optical fiber. As the distance increases the amplitude of the backscattered portions decreases. At certain points along the optical fiber there is a sharp drop (e.g., 14) in amplitude of the backscattered portions which may be due to, for example, damage in the optical fiber at that location. At other points there may be a sharp and abrupt rise (e.g., 16) in the amplitude of the backscattered portions which may be due to the presence of a discontinuity in the optical fiber path resulting from a connector that couples sections of an optical fiber. Depending on the particular data generation capacity of OTDR 118, thousands (8,000; 16,000 or 32,000) of data values points are calculated in order to create chart 10. OTDR 118 may have a visual display of chart 10 and also may provide a printout of the calculated points. A properly trained craftsperson is able to review and analyze chart 10 to determine whether the fibers within an optical link are operating properly and therefore whether the optical link is operating properly. Proper operation of the optical links of a communication system is defined by the system provider or can be based on a well accepted standard that establishes various criteria that must be met by the data gathered by the test equipment (e.g., OTDR 118). The craftsperson can also monitor the optical links of a communication system, i.e., confirming that the links are operating within bounds set by the system provider or within bounds defined by a well known standard.

Thus, for example, referring to FIG. 1, a craftsperson may be inspecting or testing optical link 106 at location 116 to determine whether a particular fiber or all of the fibers of system optical link 106 are operating properly. OTDR 118 thus can launch an optical signal or a group of optical signals through one or more fibers of optical link 122 and onto system optical link 106 which is coupled to optical link 122 at some point nearby the central office or at the central office itself. For the inspection or testing of system optical link 108, OTDR 118 would launch a signal through one or more fibers of optical link 120 and onto system optical link 108 also coupled at some point nearby the central office or at the central office itself.

The testing of spliced fibers is typically done by two craftspersons in accordance with the following procedure: a first craftsperson ("field craftsperson") constructing or repairing an optical link at a location (e.g., 116) is in communication with a second craftsperson ("central office craftsperson") at the central office. After making several connections (or splices), the field craftsperson instructs the central office craftsperson to operate OTDR 118 causing optical signals to be launched through the optical link within which the spliced (or repaired) optical fibers are located. OTDR 118 is further operated so that it detects the backscattered portions of the launched signals and generates data in the form of chart 10 of FIG. 2. Presumably, the central office craftsperson is able to review, analyze and interpret the chart generated by OTDR 118 to determine whether the spliced fibers are operating properly. The field craftsperson can splice another group of fibers and in the same manner confirm their proper operation with the central office craftsperson. The process discussed above is repeated until all of the optical fibers at one location have been properly connected or repaired. The field craftsperson then moves to another location along the optical link and repeats the entire procedure. During construction or repair of an optical link of a certain length, the field craftsperson typically has to make repairs or connections at several locations along the optical link to ensure the proper operation of the entire optical link.

The process of constructing or inspecting an optical link is thus clearly time consuming and costly. As discussed above, this process requires the skills and expertise of two craftspersons which further adds to the cost of construction and/or reparations of optical links. In order to avoid the use of two craftspersons for inspecting, repairing and/or constructing an optical link, the field craftsperson, after splicing a group of fibers, would have to return to the central office to operate OTDR 118 to determine whether the spliced optical fibers within the optical link are operating properly. As there may be hundreds of optical fibers to be connected (or spliced) at location 116, the field craftsperson would have to make several roundtrips between location 116 and the central office. Location 116 can be miles away from the central office and thus the use of only one craftsperson to construct and/or repair an optical link in such a manner is clearly impractical.

Therefore, there is a need to reduce the costs associated with using test equipment to inspect and confirm the proper operation of an optical link of a communication system during the construction, restoration and maintenance of such a system.

SUMMARY OF THE INVENTION

The present invention is a system and method for remotely monitoring at least one optical link of a communication system and to determine whether the at least one optical link is operating properly without the need for two craftspersons. The method of the present invention comprises the step of providing test equipment coupled to viewing and monitoring equipment where the test equipment is further coupled to the at least one optical link. The method of the present invention further provides the step of controlling and operating the test equipment with the viewing and monitoring equipment to monitor the at least one optical link and to determine whether the at least one optical link is operating properly.

The system comprises test equipment configured to launch and receive optical signals to and from the at least one optical link and generate data associated with the at least one optical link. The system further comprises viewing and monitoring equipment configured to operate and control the test equipment.

BRIEF DESCRIPTION OF THE DRAWINGS

FIG. 3 depicts the present invention coupled to a communication system that uses optical links to convey communication signals;

FIG. 4 depicts a portion of the chart of FIG. 2.

DETAILED DESCRIPTION

Figure 1:
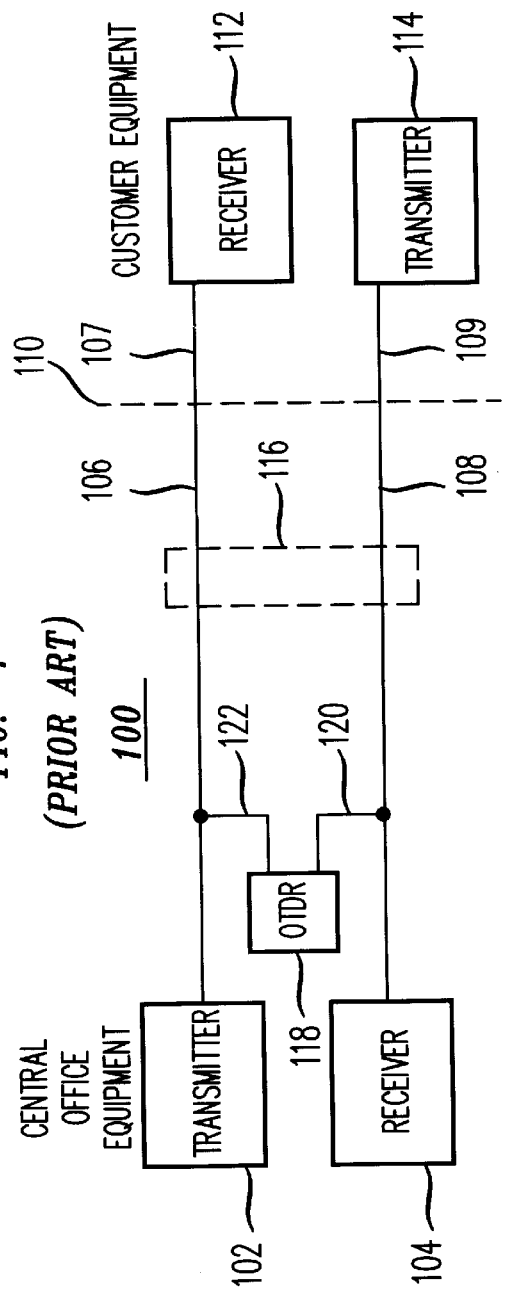
FIG. 1 is a simplified system level diagram of a prior art communication system having an optical communication link.

FIG. 3 depicts the present invention coupled to communication system 100 in which viewing and monitoring equipment 124 at location 116 is coupled to test equipment 140 at the central office via communication link 126 whereby such viewing and monitoring equipment is configured to allow a craftsperson to remotely operate and control the test equipment to monitor the system optical links (e.g., 106, 108) of the communication system to determine whether the optical links are operating properly. The present invention advantageously eliminates the need for a second craftsperson. Test equipment 140 generates data associated with the optical links (e.g., 106, 108) based on optical signals received from the optical links via links 120 and 122. Remote operation comprises any situation in which viewing and monitoring equipment 124 is coupled to test equipment 140 via communication link 126. The physical length of communication link 126 can be such that test equipment 140 and viewing and monitoring equipment 124 are proximately located with respect to each other (e.g., a few feet away from each other) or distantly located with respect to each other (e.g., miles away from each other). Therefore, the monitoring site can be located anywhere and be part of any other communication system in the same area or in an area very remote from the location of the link being tested.

Viewing and monitoring equipment 124 coupled to test equipment 140 form a system that allows a craftsperson to determine whether an optical link of the communication system is operating properly by operating viewing and monitoring equipment 124. Operation and control of test equipment 140 with the use of viewing and monitoring equipment 124 involves formulating commands (with equipment 124) that are transmitted to test equipment 140 via communication link 126. The formulated commands cause test equipment 140 to generate real time and/or historical data associated with the optical links being tested and/or monitored. Although shown to be located at location 116, viewing and monitoring equipment 124 can be located at any site from which a communication link (e.g., 126) can couple equipment 124 to test equipment 140; thus any system optical link which is coupled to test equipment 140 can be tested and monitored from any such site. Although FIG. 3 depicts viewing and monitoring equipment 124 as being remotely located from test equipment 140, the present invention also encompasses the circumstance in which test equipment 140 and viewing and monitoring equipment 124 are co-located.

Viewing and monitoring equipment 124 converts the formulated commands to appropriate control signals and transmits the control signals over communication link 126 to test equipment 140. Test equipment 140 and viewing and monitoring equipment 124 have communication devices (e.g., modems) that convert data (real time or historical data generated by test equipment 140) and control signals (generated by test equipment 140 and viewing and monitoring equipment 124), to communication signals that can be conveyed through communication link 126. Depending on the medium used for communication link 126 (e.g., copper wire, coaxial cable, air, optical fiber), the communication signals can take the form of electrical, electronic, optical or other types of communication signals. It should be noted that test equipment 140 need not be directly coupled to the optical links being tested. The present invention comprises any arrangement that allows test equipment 140 to receive or have access to optical signals from optical links of the communication system which are processed by test equipment 140 to generate the appropriate data that allows a craftsperson to determine whether the optical links are operating properly. The craftsperson determines proper operation of the optical link being tested by analyzing the data received from the test equipment. The analysis of the received data can involve the viewing of the data in graphical form or any other analysis technique typically used by a craftsperson.

The real time data are generated by test equipment 140 and are available to viewing and monitoring equipment 124 as soon as such data are generated by the test equipment. The historical data are generated by test equipment 140 but are stored for a period of time and then transmitted to viewing and monitoring equipment 124 at some later time. The data (real or historical) generated by test equipment 140 represent information associated with the optical link being tested and/or monitored. For example, the amplitude of a backscattered signal resulting from a launched signal by OTDR 118 can be part of the data or the phase relationship between optical signals (launched by OTDR 118) of the same or different wavelengths can also be part of the data generated by test equipment 140.

The generated data are typically presented or made available to a craftsperson at location 116 through the use of the viewing and monitoring equipment 124. Suitable view for use with the present invention include, for example, a portable personal computer (i.e., a laptop PC), viewing monitors (e.g., CRT displays), printers and other equipment typically used to display and/or print information in textual, graphical and other formats and which also can transmit and receive signals (e.g., control signals) over a communication link. The particular implementation of viewing and monitoring equipment 124 can be such that a craftsperson uses well known techniques to retrieve the generated data and to formulate commands that are transmitted via communication link 126 for operating and controlling test equipment 140. For example, viewing and monitoring equipment 124 can be a PC running a Windows based operating system or other Graphical User Interface (GUI) operating system.

Still referring to FIG. 3, test equipment 140 comprises Optical Test Access Unit (OTAU) 132 coupled to OTDR 118 via link 136. Test equipment 140 further comprises Test System Controller (TSC) 134 which is coupled to OTDR 118 also via link 136. OTAU 132 is further coupled to system optical link 106 with optical link 122 with the use of connector 128. Similarly, OTAU 132 is coupled to system optical link 108 with optical link 120 with the use of connector 130. Link 136 can be an electro-optical link through which electrical and/or optical signals are conveyed between OTAU 132, OTDR 118 and TSC 134. OTAU 132 is an electro-optical device that is able to selectively route optical signals from any one of a first plurality of optical links to any one of a second plurality of optical links and vice versa. OTAU 132 can be implemented as a bi-directional optical switch that is controlled by electrical control signals conveyed over link 136 or some other interface (not shown). Although OTAU 132 is shown coupled to two optical links (120 and 122) and one OTDR, it can be configured to be coupled to an indefinite number of optical links and more than one OTDR.

Figure 2:
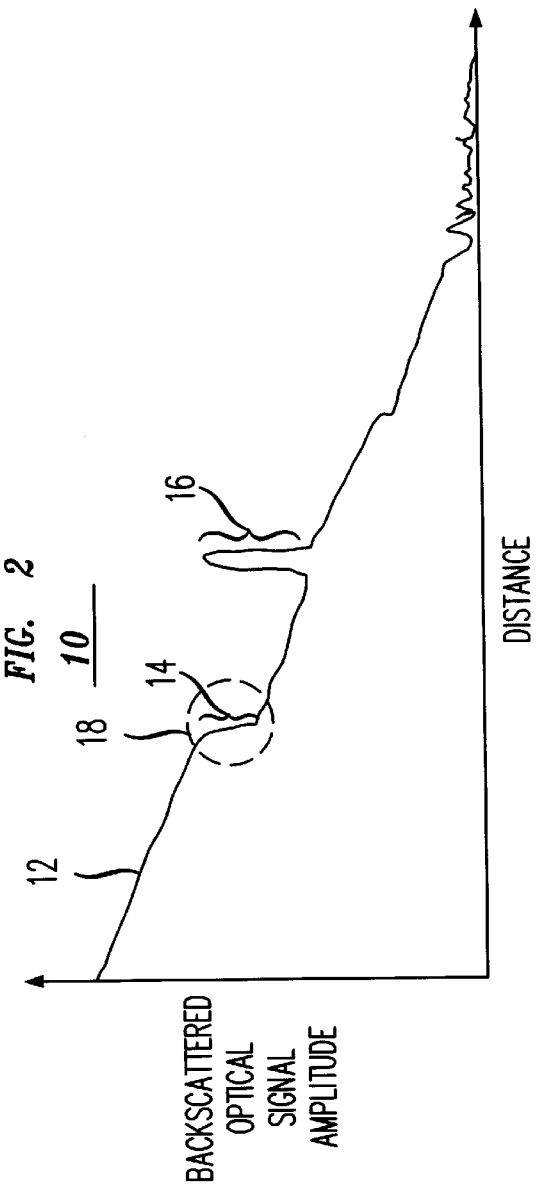
FIG. 2 is a chart of backscattered optical signals within a fiber versus distance.

OTDR 118 receives optical signals from OTAU 132 and processes such signals to generate data that can be represented in graphical form (or any other form) such as chart 10 of FIG. 2. As discussed above, OTDR 118 launches optical signals through one of a plurality of optical links (being tested and/or monitored) coupled to OTAU 132, detects the corresponding backscattered portions and generates data (real time or historical) that allow a craftsperson at the central office or at some other location (e.g., location 116) to determine whether the optical link is operating properly. OTDR 118 can be operated manually or controlled via TSC 134. TSC 134 is configured to transmit control signals over link 136 to operate OTDR 118 and OTAU 132. The control signals can originate from TSC 134 (manually operated by a craftsperson or operated with control signals) or originate from viewing and monitoring equipment 124 and sent over communication link 126 to TSC 134 which in turn would generate the proper control signals over link 136 to properly operate OTDR 118 and OTAU 132.

The control signals and the data generated by OTDR 118 have a format which includes such factors as how the data are packaged, stored and arranged and what standards and protocols are followed when the data (and control signals) are transmitted and received. The control signals and data conveyed over communication link 126 may have the same or different format as the control signals and data conveyed over link 136. TSC 134 has the capability to convert the format of the control signals to a format that is compatible with a format being used by viewing and monitoring equipment 124. TSC 134 further has the ability to convert the format of the generated data to a format that is compatible with a format being used by viewing and monitoring equipment 124 allowing a craftsperson at location 116 to view the data in the same form (e.g., graphical representation) as the form used by OTDR 118. Compatible formats are formats with follow the same or equivalent rules of data packaging, data storing and data arrangement so that such formats can be used interchangeably. The conversion of the data and control signals from one format to another format can be done automatically (i.e., according to programmed instructions) by TSC 134 or can be done as a result of a command or commands formulated with viewing and monitoring equipment 124.

In accordance with another aspect of the present invention, it should be noted that viewing and monitoring equipment 124 can also allow the craftsperson to view the data in a different form than the form being used by OTDR 118. For example, the generated data may be shown in graphical form at OTDR 118, but a craftsperson at location 116 has the capability to view the same data as a printout or a display of a list of calculated points. Thus, OTDR 118 can be completely controlled by TSC 134 with the use of control signals whereby the control signals either originate from TSC 134 or from viewing and monitoring equipment 124 and conveyed via communication link 126. Therefore, a craftsperson at location 116 can determine whether the optical fibers (recently spliced or existing fibers) are operating properly by remotely controlling and operating test equipment 140 with the use of viewing and monitoring equipment 124.

The following procedure describes how any one of a plurality of optical links can be tested and/or monitored by a craftsperson at location 116. A craftsperson at location 116 operates (i.e., formulates commands) viewing and monitoring equipment 124 such that equipment 124 transmits control signals to OTAU 132 via communication link 126, TSC 134, link 136, and OTDR 118 causing OTAU 132 to select an optical link to be tested. Next, the craftsperson can send another command (in the form of control signals) to OTDR 118 to cause OTDR 118 to launch an optical signal through the selected optical link, detect the corresponding backscattered signals, process the backscattered signals and generate data (e.g., graphical data such as chart 10) associated with the selected optical link. The craftsperson can then, with the use of viewing and monitoring equipment 124, command OTDR 118 to transmit the data (real time and/or historical data) to viewing and monitoring equipment 124 allowing the craftsperson to determine whether the optical link being tested is operating properly or is operating in accordance with requirements set by the service provider. The craftsperson at location 116 can thus view and monitor (i.e., confirm proper operation) real time or historical data for connections (or splices) that are being made.

The craftsperson at location 116 can modify the received graphical data so as to view various segments of the data. For example, the craftsperson can focus on the characteristics of a certain portion of the optical link and view those characteristics in more detail with, for example, a "zoom" command. The "zoom" command would result in a portion of the chart being magnified as shown in FIG. 4. The "zoom" command can be part of a set of commands available to the craftsperson for operating test equipment 140 with viewing and monitoring equipment 124. The area delineated by reference number 18 in FIG. 3 is the portion of the chart that is shown in FIG. 4. The craftsperson at location 116 can analyze any designated portion of the optical link being tested. Also, as stated earlier, OTDR 118 uses a certain number of points chosen from a specific set (e.g., 8,000, 16,000 or 32,000) of points used to generate the chart shown in FIG. 10. The craftsperson at location 116 has the ability to have OTDR 118 use any of the available set of points to generate graphical data or any other type of data that is used to determine the operability of an optical fiber. It should be noted that although an OTDR has been used to implement the launching of optical signals and the processing of the backscattered optical signals, the present invention comprises the use of any combination of various equipment to launch optical signals in response to control signals and detect and process the backscattered optical signals to generate data as discussed supra.

It should also be noted that OTDR 118 can include TSC 134 such that OTDR 118 is connected directly to viewing and monitoring equipment 124. Also, OTAU 132 can be included in OTDR 118. Test equipment 140 can thus be implemented as a single piece of equipment that can be used to test optical links, i.e., perform all of the aforementioned functions of OTAU 132, OTDR 118 and TSC 134. It should further be noted that more than one viewing and monitoring equipment (not shown) can be connected to TSC 134. In such a circumstance, TSC 134 can be configured (or programmed) to select among a plurality of optical links and provide data (generated by OTDR 118) to one or more viewing and monitoring equipment in accordance with a priority scheme devised by the service provider or in accordance with a priority scheme based on other factors such as time of day, location of the remote equipment or any other feasible factor. In this manner, equipment 140 can test optical links automatically (i.e., according to programmed instructions) or under the control of one or several craftspersons. For example, certain links connected to test equipment 140 can be tested and/or monitored on a regular basis (e.g., hourly, daily, weekly, monthly) to ensure that those links are operating properly. TSC 134 may also have the ability to allow a craftsperson at the central office (or at a location remote from the central office) to obtain the highest priority and test a particular optical link on demand bypassing any existing priority scheme established by the service provider. TSC 134 can be implemented with microprocessor, memory and logic circuitry, a PC or implemented as a mainframe computer having the proper Input/Output (I/O) ports to OTDR 118 and communication link 126.

It should further be noted that the system and method of the present invention is not limited to system provider optical links but can also test and/or monitor any other optical link that is part of or connected to a communication system.

We claim:

1. A method for monitoring at least one optical link of a communication system and for determining whether the at least one optical link is operating properly, the method comprising the steps of:

providing test equipment comprising an Optical Time Domain Reflectometer (OTDR), an Optical Test Access Unit (OTAU) and a Test System Controller (TSC) which are coupled to each other where such test equipment is coupled to viewing and monitoring equipment and such test equipment is further coupled to the at least one optical link; and controlling and operating the test equipment with the viewing and monitoring equipment to monitor the at least one optical link to determine whether the at least one optical link is operating properly.

2. The method of claim 1 wherein the step of providing viewing and monitoring equipment comprises providing said viewing and monitoring equipment at a site remotely located from the test equipment and coupled to the test equipment via a communication link.

3. The method of claim 1 wherein the step of controlling and operating the test equipment with the use of the monitoring and viewing comprises formulating a command with the viewing and monitoring equipment.

4. The method of claim 3 wherein the step of formulating a command further comprises the step of generating control signals based on the formulated command and transmitting the control signals to the test equipment.

5. The method of claim 4 wherein the step of generating and transmitting control signals further comprises the step of generating data associated with the at least one optical link in response to the control signals transmitted by the viewing and monitoring equipment.

6. A method for monitoring at least one optical link of a communication system and for determining whether the at least one optical link is operating properly with the use of test equipment comprising an OTDR, an OTAU and a TSC which are coupled to each other, the method comprising the steps of:

provinding viewing and monitoring equipment and test equipment comprising an OTDR, an OTAU and a TSC;

formulating a command with the viewing and monitoring equipment to cause the test equipment to generate data;

receiving the data generated by the test equipment where the data are associated with the at least one optical link; and determining from the generated data whether the at least one optical link is operating properly.

7. The method of claim 6 wherein the step of formulating a command further comprises the step of transmitting the command to the test equipment causing the test equipment to select the at least one optical link and generate data associated with the at least one optical link.

8. The method of claim 6 wherein the step of receiving the data further comprises the step of entering a command that causes the data to be converted to a format that is compatible with a format being used by the viewing and monitoring equipment.

9. The method of claim 6 wherein the step of determining whether the at least one optical link is operating properly comprises the step of analyzing the received data.

10. A system for monitoring at least one optical link of a communication system and for determining whether the at least one optical link is operating properly, the system comprises:

test equipment comprising an OTDR, an OTAU and a TSC which are coupled to each other and which are configured to launch and receive optical signals to and from the at least one optical link of the communication system and generate data associated with the at least one optical link where the data is based on the received optical signals; and viewing and monitoring equipment configured to operate and control the test equipment.

11. The system of claim 10 wherein the test equipment is located at a central office of the communication system and the viewing and monitoring equipment is coupled to the test equipment via a communication link where the viewing and monitoring equipment is remotely located from the test equipment.

12. The system of claim 10 wherein the viewing and monitoring equipment is configured to transmit control signals to the test equipment so as to control and operate the test equipment where the control signals are generated by the viewing and monitoring equipment based on commands formulated with the viewing and monitoring equipment.

13. The system of claim 10 where the test equipment is coupled to a plurality of optical links and at least one viewing and monitoring equipment allowing the plurality of optical links to be tested automatically in accordance with a priority scheme.

14. The system of claim 13 where a plurality of viewing and monitoring equipment is coupled to the test equipment and where at least one of the viewing and monitoring equipment can test the at least one optical link on demand bypassing the priority scheme.

15. The system of claim 10 where the test equipment is operated and controlled via a plurality of viewing and monitoring equipment.

16. The system of claim 10 where the TSC is coupled to the viewing and monitoring equipment.

17. The system of claim 10 where the OTAU is coupled to the at least one optical link.

18. Test equipment comprising:

an OTAU coupled to at least one optical link of a communication system which OTAU selectively routes optical signals received from the at least one optical link;

an OTDR coupled to the OTAU such that the OTDR receives the optical signals routed by the OTAU and is configured to process the received optical signals; and a TSC coupled to the OTDR and OTAU and configured to operate and control the OTDR and the OTAU whereby the test equipment is configured so as to be controlled and operated with viewing and monitoring equipment and the test equipment is further configured to launch and receive optical signals associated with the at least one optical link and generate data based on the received optical signals.

19. The test equipment of claim 18 coupled to viewing and monitoring equipment via a communication link such that the test equipment can be controlled and operated with the viewing and monitoring equipment.

20. The test equipment of claim 19 further configured to generate data having a format that is compatible with a format being used by the viewing and monitoring equipment.

21. The test equipment of claim 18 coupled to the at least one optical link with the use of an optical link.

22. The test equipment of claim 18 further configured to receive optical signals from a plurality of optical links and generate data associated with the plurality of optical links in accordance with a priority scheme.

23. The test equipment of claim 18 wherein the OTDR is configured to generate data from the received optical signals.

24. The test equipment of claim 18 wherein the TSC is further coupled to viewing and monitoring equipment via a communication link allowing the viewing and monitoring equipment to control and operate the test equipment.

25. The test equipment of claim 24 wherein the TSC receives data generated by the OTDR and processes the data so that the data has a format that is compatible with a format used by the viewing and monitoring equipment.

* * * * *